United States Patent [19]

Post

[11] Patent Number: 4,632,141
[45] Date of Patent: Dec. 30, 1986

[54] VALVE ARRANGEMENT

[75] Inventor: Steven W. Post, Jonesboro, Ark.

[73] Assignee: FMC Corporation, Chicago, Ill.

[21] Appl. No.: 778,336

[22] Filed: Sep. 20, 1985

[51] Int. Cl.⁴ ............................................. F16K 15/08
[52] U.S. Cl. ................................ 137/327; 137/543.15;
251/362; 417/454
[58] Field of Search ................... 137/327, 543.15, 902;
251/362; 417/454

[56] References Cited

U.S. PATENT DOCUMENTS

| 5,881 | 5/1874 | Hooker | 137/543.15 |
| 466,838 | 1/1892 | Shaddick | 137/543.15 X |
| 3,792,939 | 2/1974 | Zalis | 417/454 |

FOREIGN PATENT DOCUMENTS 661653 11/1951 United Kingdom ................ 417/454

*Primary Examiner*—Robert G. Nilson
*Attorney, Agent, or Firm*—Douglas W. Rudy; Richard B. Megley

[57] ABSTRACT

A check valve is provided for use in a fluid pump wherein the check valve is associated with a valve spyder providing a means for rapidly removing the check valve from the host valve receiving bore.

2 Claims, 2 Drawing Figures

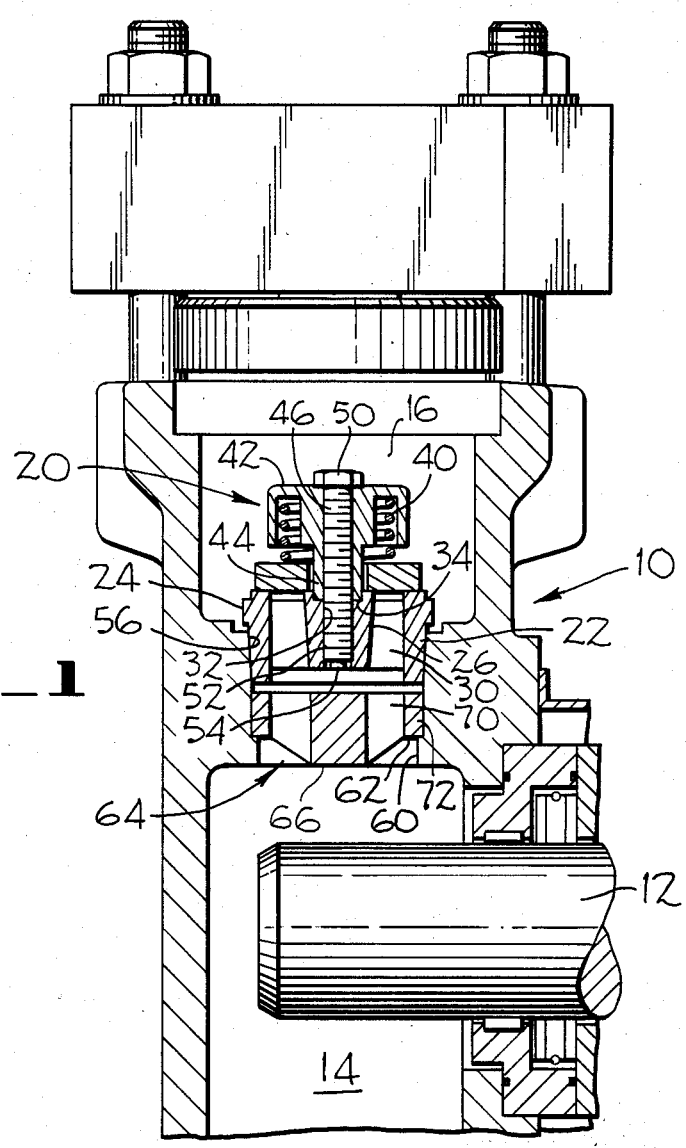
FIG_1
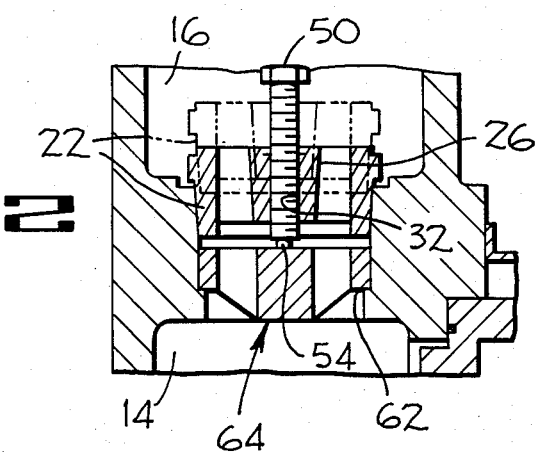
FIG_2

VALVE ARRANGEMENT

BACKGROUND OF THE INVENTION

1. Field of the Invention

This invention pertains to check valves, relief valves and similar biased valves as used in fluid delivery systems and more particularly to a check valve component for expediting the removal of the check valve.

2. Description of the Prior Art

Check valves of the type related to this invention have required specialized tools in order that they be removed for service. Removal of check valves in the prior art required partial disassembly of the check valve in situ and attachment of a removal tool such as a hydraulic seat puller, a screw type puller or an impact puller such as a slide hammer in order that the valve body could be removed from the host housing.

Such special handling is undesirable, time consuming and potentially detrimental to the valve. Slide hammer action or valve puller action on the components could cause damage to the valve or the host housing.

SUMMARY OF THE INVENTION

The present invention comprises a tapered valve, such as a check valve, carried in a host housing such as a fluid pump housing. The tapered valve is positioned in a bore in proximity to a valve spyder also carried in the bore. The valve spyder is inboard of the valve in the bore.

The valve body is provided with a threaded hub having a threaded through bore accommodating a threaded valve fastener.

The valve spyder incorporates a solid center hub positioned in an aligned relationship to the threaded through bore of the valve body.

With the valve and valve spyder properly installed in a pump housing, for instance, removal of the valve can be easily accomplished by screwing the fastener through the threaded bore of the valve body until the inboard end of the fastener contacts the solid hub of the valve spyder. Further penetration of the fastener through the threaded bore will cause the valve to be forced out of the host bore of the pump housing as the force of the frictional contact between the valve and the bore will be overcome by the force of the fastener inboard end on the valve spyder hub.

BRIEF DESCRIPTION OF THE DRAWINGS

FIG. 1 is a partially sectioned view of the invention in a partially sectioned housing.

FIG. 2 shows the invention of FIG. 1 with a broken line presentation of the valve body moved to a removed position.

DESCRIPTION OF THE PREFERRED EMBODIMENT

FIG. 1 shows a partially sectioned pump housing, generally 10 which in the embodiment shown is a positive displacement piston pump. A fluid displacing piston 12 can be moved into and out of a fluid chamber 14 in the pump housing. Fluid chamber 14 may communicate with fluid chamber 16 when a check valve, generally 20, is open.

The check valve generally 20 has a tapered body 22 which is provided with a shoulder 24 on the outer periphery of the upper section of the tapered body. A central hub 26 is carried inboard of the tapered body and is supported by multiple webs such as 30 radiating from the central hub to the tapered body. The central hub is provided with a threaded through bore and a shallow counterbore 34.

A valve plate 36 is provided to close one end of the check valve in a conventional manner. Spring 40, restrained by a spring retainer 42 normally urges the valve plate 36 into position to close the valve. A shank portion 44 of the spring retainer fits into the shallow counter bore 34 to align the spring retainer with the central hub 26 while providing guidance to the valve plate 36.

A threaded fastener 46 is sized to engage the threaded through bore 32 of the central hub 26. The threaded fastener has a head portion 50, shown in this embodiment as a conventional bolt head but not restricted to such a head style as long as the head provided can be driven at a torque sufficient to provide extraction of the valve. The inboard end 52 of the threaded fastener is provided with a working projection such as 54 which, in a preferred embodiment has a diameter less than the diameter of the threaded fastener body section.

The tapered body 22 is installed in a mating tapered bore 54 in the pump housing. The tapered bore 54 extends to a straight wall section of the same bore and to a decreased diameter section 60 that provides a shoulder 62 for restraining a valve spyder generally 64 in the straight wall section of the valve hosting bore.

The valve spyder 64 has a solid central hub 66 carried by multiple webs such as 70. Attached to a rim 72. The rim 70 contacts the shoulder 62 and the straight bore walls. The valve spyder 64 and its hub 66 are aligned with, but may be spaced apart from, the valve generally 20 as shown in FIG. 1.

The operation of the invention can best be described by looking at FIG. 2 where the same reference numerals identify the like parts presented in FIG. 1.

In this Figure the valve is shown being removed from its tapered bore. To perform the operation the fastener 50 was removed and the spring retainer, spring and valve plate were removed. The threaded fastener 50 was reinserted into the threaded through bore 32 of the central hub 26 until the threaded fastener working projection 54 contacted the solid central hub 66 of the valve spyder generally 64. That is the position of the solid line components in FIG. 2.

To remove the tapered body from the tapered bore the threaded fastener is threaded or tightened further so that as it, through its working projection, pushes against the valve spyder the tapered valve body will be urged away from the valve spyder overcoming the frictional load between the tapered valve body and the tapered bore thereby releasing the valve body from the bore. The valve spyder is restrained through its contact with the shoulder 62 and is thus an unmovable anvil resisting the force of the threaded fastener.

With the valve removed the valve spyder can also be easily removed through the tapered end of the host bore.

Although the best mode contemplated for carrying out the present invention has been herein shown and described, it will be apparent that modifications and variations may be made without departing from what is regarded to be the subject matter of the invention.

What is claimed is:

1. In a valve having a tapered body, said valve restrained in a bore of a host means, a central hub supported in said tapered body, said central hub having a threaded through bore, a threaded fastener carried in said threaded through bore of said central hub;

a valve spyder restrained in a bore of a host means adjacent to and inboard of said valve whereby said threaded fastener may project from said threaded through bore of said central hub to contact said valve spyder.

2. The invention in accordance with claim 1 wherein said valve spyder comprises a solid central hub supported by web means extending to rim means of said valve spyder.

* * * * *